United States Patent [19]
Kersey et al.

[11] Patent Number: 5,945,666
[45] Date of Patent: Aug. 31, 1999

[54] HYBRID FIBER BRAGG GRATING/LONG PERIOD FIBER GRATING SENSOR FOR STRAIN/TEMPERATURE DISCRIMINATION

[75] Inventors: Alan D. Kersey, Fairfax Station, Va.; Heather J. Patrick, Wheaton, Md.

[73] Assignee: The United States of America as represented by the Secretary of the Navy, Washington, D.C.

[21] Appl. No.: 08/858,633

[22] Filed: May 19, 1997

Related U.S. Application Data

[60] Provisional application No. 60/019,038, May 20, 1996.

[51] Int. Cl.⁶ .................................................... G02F 1/025
[52] U.S. Cl. ................................ 250/227.14; 250/227.18; 250/227.23; 385/12; 385/37
[58] Field of Search ......................... 250/227.14, 227.16, 250/227.17, 227.18, 227.19, 227.21, 227.23, 231.1, 237 G; 385/12, 13, 37

[56] References Cited

U.S. PATENT DOCUMENTS

| | | | |
|---|---|---|---|
| 5,319,435 | 6/1994 | Melle et al. | 356/32 |
| 5,394,488 | 2/1995 | Fernald et al. | 385/13 |
| 5,397,891 | 3/1995 | Udd et al. | 250/227.18 |
| 5,401,956 | 3/1995 | Dunphy et al. | 250/227.18 |
| 5,426,297 | 6/1995 | Dunphy et al. | 250/227.23 |
| 5,430,817 | 7/1995 | Vengsarkar | 385/37 |
| 5,488,475 | 1/1996 | Friebele et al. | 356/32 |
| 5,493,390 | 2/1996 | Varasi et al. | 356/32 |
| 5,513,913 | 5/1996 | Ball et al. | 374/120 |
| 5,641,956 | 6/1997 | Vengsarkar et al. | 250/227.14 |
| 5,760,391 | 6/1998 | Narendran | 250/227.14 |

OTHER PUBLICATIONS

Publication, "Simultaneous Strain and Temperature Sensing with Photogenerated In–Fiber Gratings", by S.E. Kanellopoulos et al., *Optics Letters*, vol. 20, No. 3, Feb. 1, 1995, pp. 333–335.

Publication, "Multiplexed Fiber Bragg Grating Strain–Sensor System With a Fiber Fabry–Perot Wavelength Filter" by A. D. Kersey et al., *Optics Letters*, vol. 18, No. 16, Aug. 15, 1993, pp. 1370–1372.

Publication "Strain/Temperature Discrimination Using Combined Fiber Bragg Grating and Long Period Grating Sensors" by H. Patrick et al., Conf. Proceedings, OFS–11, Sapporo, Japan, May 20, 1996, pp. 2–5.

*Primary Examiner*—John R Lee
*Attorney, Agent, or Firm*—Thomas E. McDonnell; George Jameson

[57] ABSTRACT

A grating sensor system for simultaneously determining strain and temperature is disclosed, which system comprises: a light source for providing a continuous broadband light; a single mode fiber coupled to the light source; a hybrid fiber grating sensor written into the single mode fiber, the sensor comprised of a long period grating having a first center wavelength and first and second fiber Bragg gratings respectively having second and third center wavelengths for respectively reflecting light therefrom at about the second and third center wavelengths, with the first center wavelength being between the second and third center wavelengths, the long period grating producing a broadband power loss around its first center wavelength, the first center wavelength shifting with strain and temperature, the sensor measuring the effect of the long period grating wavelength shift on the relative intensities of the light reflected from around the second and third wavelengths; an optical analyzer responsive to the reflected light signals from the hybrid fiber grating sensor for measuring the wavelengths and intensities in the reflected light signals; and a circuit responsive to the measured wavelengths and intensities of light from the optical analyzer for simultaneously calculating the strain and temperature being sensed by the sensor.

12 Claims, 3 Drawing Sheets

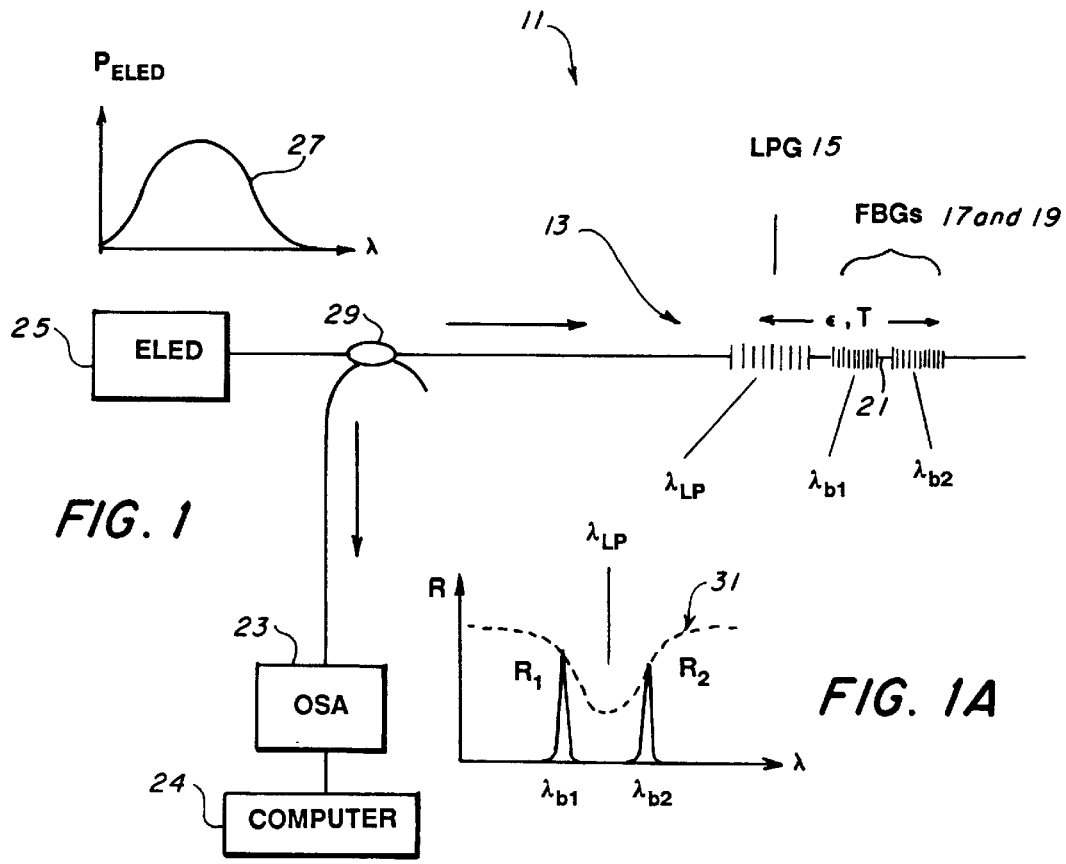
FIG. 1
FIG. 1A
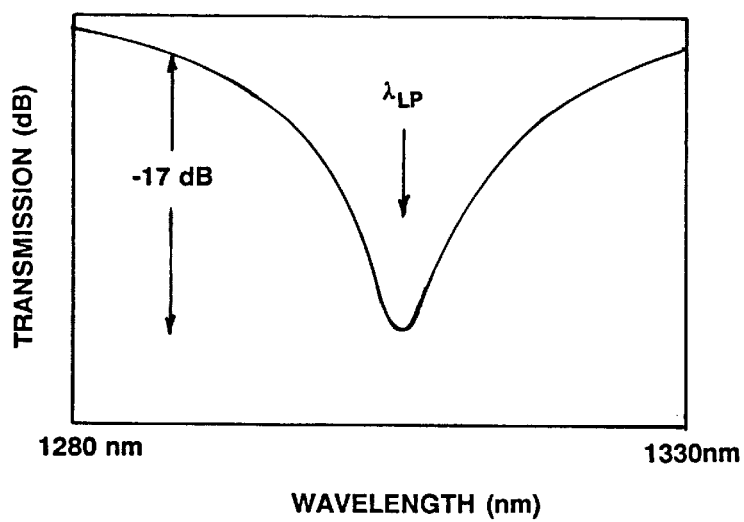
FIG. 2

HYBRID FIBER BRAGG GRATING/LONG PERIOD FIBER GRATING SENSOR FOR STRAIN/TEMPERATURE DISCRIMINATION

This application claims the benefit of U.S. Provisional Application No. 60/019,038, filed on May 20, 1996.

BACKGROUND OF THE INVENTION

1. Field of the Invention

The present invention relates to sensors and more particularly to a sensor which uses the difference in strain and temperature response of fiber Bragg gratings and a long period fiber grating to discriminate between strain and temperature induced wavelength shifts.

2. Description of Related Art

Fiber Bragg gratings (FBGs) are emerging as a new sensor technology for the monitoring and spatial analysis of structural loading. Considerable effort has been expended on the development of fabrication techniques and instrumentation for detecting small wavelength shifts associated with these devices as sensors. One of the remaining technical issues associated with FBG strain sensors is that of thermal apparent strain, which is the inability to distinguish wavelength shifts produced by strain from those produced by temperature.

It is possible to separate strain and temperature by simultaneously measuring the wavelength shift in two gratings which have different responses to strain and temperature. This method depends on having the ratio of strain responses of the two gratings be different from the ratio of temperature responses. One group of scientists have demonstrated this with two FBGs written at 850 and 1300 nanometers (nm), but the ratio of the responses differed by only 15%.

A second group of scientists have reported using an FBG and a long period rocking filter, and observed a large difference in the ratio of responses between the two devices. However, the broadband spectrum of the rocking filter made accurate detection of the wavelength difficult, an effect which the second group overcame by using two rocking filters in a cavity configuration. However, this second group reported large errors of +/−165 $\mu$strain in determining strain.

Applicants know of no one in the prior art who has described or demonstrated a sensor which uses the difference in strain and temperature response of fiber Bragg gratings and a long period fiber grating to discriminate between strain and temperature induced wavelength shifts.

SUMMARY OF THE INVENTION

It is therefore an object of the invention to provide a sensor which uses the difference in strain and temperature response of fiber Bragg gratings and a long period fiber grating to discriminate between strain and temperature induced wavelength shifts.

Another object of the invention is to provide a sensor which allows strain and temperature readings to be simultaneously obtained by reading out the wavelength shift and reflected power from fiber Bragg grating reflection signals that have passed through a long period fiber grating incorporated with two fiber Bragg grating sensors.

A further object of the invention is to provide a hybrid grating sensor for the simultaneous determination of strain and temperature based on the use of a combination of long period fiber grating and fiber Bragg grating elements.

These and other objects of this invention are achieved by providing a sensor which allows strain and temperature readings to be simultaneously obtained by reading out the wavelength shift and reflected power from fiber Bragg grating reflection signals that have passed through a long period fiber grating incorporated with two fiber Bragg grating sensors.

BRIEF DESCRIPTION OF THE DRAWINGS

These and other objects, features and advantages of the invention, as well as the invention itself, will be better understood by reference to the following detailed description of a preferred embodiment of the invention. However, it should be understood that many modifications and variations of the invention are possible within the purview of the described invention. The preferred embodiment of the invention is described with respect to the accompanying drawings wherein like reference numerals designate identical or corresponding parts throughout the several views and wherein:

FIG. 1 is a schematic block diagram of a preferred embodiment of the FBG/LPG strain/temperature sensor and detection system of the invention;

FIG. 1A illustrates the effect of the LPG 15 wavelength shift on the relative intensities of the two FBG reflections $R_1$ and $R_2$ from the respective FBGs 17 and 19 in FIG. 1;

FIG. 2 illustrates the transmission spectrum of the LPG 15 of FIG. 1;

DETAILED DESCRIPTION OF A PREFERRED EMBODIMENT

Figure 3A:
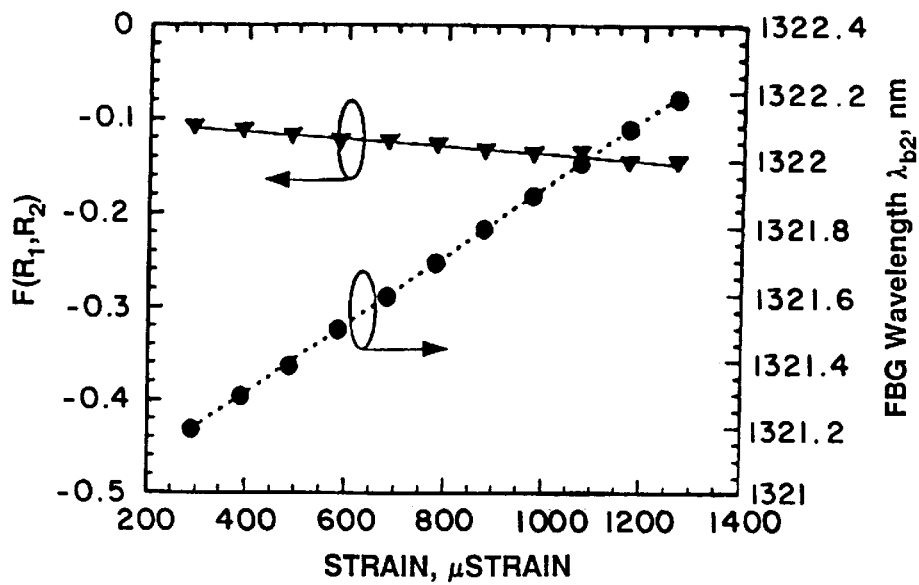
FIG. 3A is a graph showing $F(R_1,R_2)$ and $\lambda_{b2}$ vs. strain in $\mu$strain, measured while the sensor 11 was held at a temperature of 38° C., and linear fits to the data.

Referring now to the drawings, a schematic block diagram of a preferred embodiment of the fiber Bragg grating/ long period (fiber) grating strain/temperature sensor and detection system 11 of the invention is shown in FIG. 1. The fiber Bragg grating/long period (fiber) grating (FBG/LPG) sensor 13 includes a series of three gratings, one 2.5-cm-long long period grating (LPG) 15 with a center wavelength $\lambda_{LP}$ of 1306 nm, and two 5-mm-long fiber Bragg gratings (FBGs) 17 and 19 with center wavelengths respectively at $\mu_{b1}$=1293 nm and $\lambda_{b2}$=1321 nm.

For an initial demonstration, the FBGs 17 and 19 were written into a Lycom single-mode fiber 21 and then fused to the end of the LPG 15. The typical shift of the center wavelength of an FBG (17 or 19) at 1300 nm with temperature and strain is 0.009 nm/° C. and 0.001 nm/$\mu$strain. The LPG 15 produces a broadband loss about the center wavelength, as shown in FIG. 2. The center wavelength shifts with strain and temperature, with the exact response for a particular device dependent on the fiber type and the grating period. The LPG 15 used in this initial demonstration was written in AT&T 3D fiber (single mode down to 980 nm) with a grating period of 246 $\mu$m. The response of this LPG 15 was previously measured to be 0.06 nm/° C. and 0.0005 nm/$\mu$strain. Thus, the LPG 15 response to strain is about half that of the FBGs 17 and 19, while the LPG 15 response to temperature is about 7 times larger than that of the FBGs.

In principle, a hybrid FBG/LPG grating sensor 13 could be constructed from a single LPG and a single FBG, with the wavelength shifts measured directly using an optical spectrum analyzer (OSA) 23, such as an Ando AQ-6310B spectrum analyzer. However, it is difficult to accurately measure the center wavelength of the LPG 15 because of its large bandwidth. In addition, since the LPG 15 has no reflection spectrum, it would require additional instrumentation compared to FBG interrogation techniques, which generally measure the wavelength shift of the FBG reflection spectrum.

Instead, the hybrid sensor 13 of FIG. 1 measures the effect of the LPG wavelength shift on the relative intensities of the two FBG reflections $R_1$ and $R_2$ (shown in FIG. 1A), allowing interrogations of the LPG sensor using the FBG sensor signals.

In operation, light from a broadband light source 25, such as an ELED, has a source or ELED power spectrum 27. This broadband light passes through an exemplary 3 dB. optical coupler 29 and then passes through the LPG 15 and is attenuated near $\lambda_{LP}$, as shown in FIG. 2. This light is reflected by the FBGs 17 and 19, whose wavelengths are chosen to lie near the 50% transmission points of the LPG 15. Upon reflection from the FBGs 17 and 19, the light again passes through the LPG 15, and then through the coupler 29 and into the optical spectrum analyzer (OSA) 23 which, as indicated before, can be an Ando AQ-6310B spectrum analyzer. The OSA 23 sees only the power reflected by the two FBGs 17 and 19. The OSA 23 measures the intensity and wavelengths of the light ($\lambda_{b1}$ and $\lambda_{b2}$) reflected by the FBGs 17 and 19, $R_1$ and $R_2$ and their wavelengths. $R_1$ and $R_2$ are normalized to the input spectrum of the source 25 (stored trace). The ratio $R_1/R_2$ depends on $\lambda_{LP}$ and on $\lambda_{b1}$ and $\lambda_{b2}$. The ratio of the two reflected signals at $\lambda_{b1}$ and $\lambda_{b2}$ is a measure of temperature and the shift in wavelength of the two wavelengths is a measure of the strain.

It should be noted at this time that the OSA 23 transmits $R_1$, $R_2$, $\lambda_{b1}$ and $\lambda_{b2}$ to a computer 24, which subsequently calculates F (to be discussed) and then substitutes into Eq. 2 (to be discussed) and does a matrix inversion to calculate strain and temperature (to be discussed). It should also be noted that a microprocessor or other suitable computing unit could have been used in the system instead of the computer 24. The output of the computer 24 can be stored, outputted to a printer or display unit, or utilized in some other manner.

The dotted line 31 in FIG. 1A indicates the effect of the attenuation of the LPG 15 on the reflections from the FBGs 17 and 19. $R_1$ and $R_2$ (FIG. 1A) are the FBG reflections divided by a stored trace of the ELED power spectrum 27. A trace of the ELED power spectrum 27 is stored in the OSA 23 so that signals (to be explained) can be normalized. One way that a trace of the ELED power spectrum 27 could be stored in the OSA 23 is by decoupling the coupler 29 from both the ELED 25 and the OSA 23, and then feeding the output of the ELED 25 directly into the OSA 23 before recoupling the coupler 29 as shown in FIG. 1.

When the sensor 13 is strained, or the temperature changes, the difference between $R_1$ and $R_2$ changes because the response of the LPG 15 is different from that of the FBGs 17 and 19. A change in strain leads to a small decrease in $R_1$ and small increase in $R_2$, because the shift in $\lambda_{LP}$ lags the shift in $\lambda_{b1}$ and $\lambda_{b2}$. However, a change in temperature produces a large increase in $R_1$ and a large decrease in $R_2$, because the shift in $\lambda_{LP}$ leads the shifts in $\lambda_{b1}$ and $\lambda_{b2}$. This allows the spectral shift of the LPG 15 to be measured simply by measuring the Bragg grating reflections. Dividing the FBG reflections by the ELED power spectrum insures that the change in the source spectrum (27) vs wavelength ($\lambda$) does not give a false change in the levels of $R_1$ and $R_2$.

To analyze the reflectance signals, it is necessary to calculate the function $F(R_1, R_2)$ given by:

$$F(R_1, R_2) = \frac{(\sqrt{R_1} - \sqrt{R_2})}{(\sqrt{R_1} + \sqrt{R_2})} \quad (1)$$

$F(R_1, R_2)$ can be viewed in the following way: $R_1$ is the source 25 power multiplied by the reflectance of $\lambda_{b1}$ and the square of the LPG 15 transmission at $\lambda_{b1}$ (since the light passes through the LPG 15 twice). Therefore $\sqrt{R_1}$ is proportional to the LPG transmission at $\lambda_{b1}$. Similarly, $\sqrt{R_2}$ is proportional to the LPG transmission at $\lambda_{b2}$. Since the LPG transmission vs. wavelength is approximately linear over the region that the FBG and LPG overlap, $\sqrt{R_1}$, $\sqrt{R_2}$, and the difference of $\sqrt{R_1}$ and $\sqrt{R_2}$ are linearly proportional to the amount by which $\lambda_{LP}$ leads or lags $\lambda_{b1}$ and $\lambda_{b2}$. This wavelength difference is linearly proportional to the change in strain and temperature. Then the difference of $\sqrt{R_1}$ and $\sqrt{R_2}$ is divided by the sum of $\sqrt{R_1}$ and $\sqrt{R_2}$ to correct for fluctuations in the amount of light reaching the OSA 23. This second normalization is necessary because, while the initial division of the FBG reflections by the ELED power spectrum 27 removes false signals that would be caused by the change in ELED power vs. wavelength (as shown in the waveform 27), it does not account for the changes caused by the fluctuations in the total power reaching the OSA 23 (caused, for example, by changes in the ELED power output). Dividing by the sum of $\sqrt{R_1}$ and $\sqrt{R_2}$ introduces a slight nonlinearity, but it is insignificant over the strain and temperature range measured. Thus, $F(R_1, R_2)$ is linearly proportional to the change in strain and temperature. This enables a matrix to be written relating the change in $F(R_1, R_2)$ and the change in one of the FBG wavelengths to strain and temperature. Inverting the matrix allows the simultaneous measurement of $F(R_1, R_2)$ and one of the FBG wavelengths to give strain and temperature, without having to determine $\lambda_{LP}$ directly.

Experiment

The sensor 11 was calibrated by simultaneously measuring the shift in one of the FBG wavelengths and the change in $F(R_1, R_2)$ as known strains and temperatures were applied. The sensor 11 was strained using a micrometer driven stage, which allowed the strain to be set to within +/−5 μstrain. The temperature was controlled by running current through a heating coil (not shown) surrounding the optical fiber, and simultaneously measuring the temperature at the fiber with a calibrated thermister (not shown). The temperature could be maintained to +/−0.5° C.

Figure 3B:
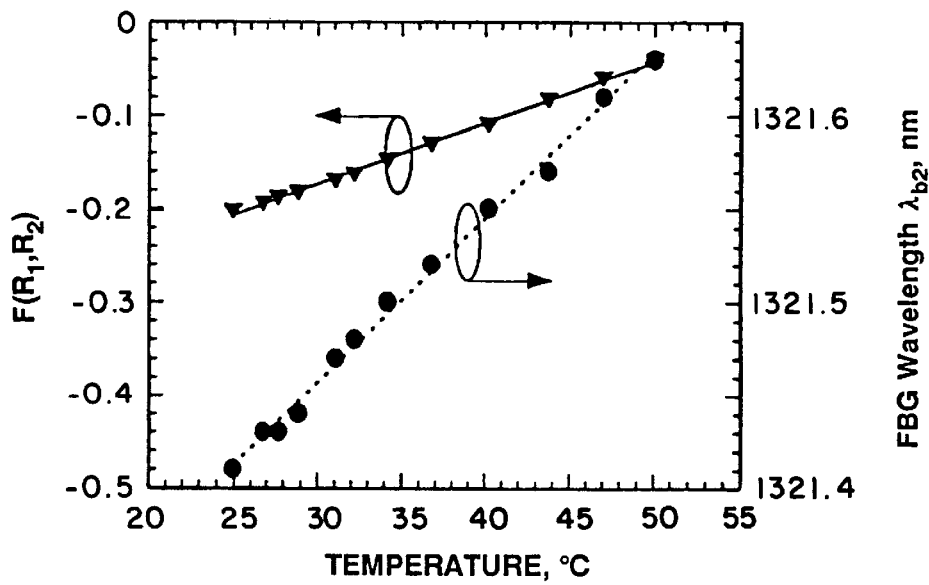
FIG. 3B is a graph showing $F(R_1,R_2)$ and $\lambda_{b2}$ vs. temperature in °C., measured while the sensor was held at 590 $\mu$strain, and linear fits to the data.

$F(R_1, R_2)$ and $\lambda_{b2}$ were measured using an Ando AQ-6310B spectrum analyzer. The results for $F(R_1, R_2)$ and $\lambda_{b2}$ vs. strain while the sensor 13 was held at a set temperature of 38° C. are shown in FIG. 3A. Similarly, the results for $F(R_1, R_2)$ and $\lambda_{b2}$ vs. temperature at a fixed strain of 590 μstrain is shown in FIG. 3B. Similar measurements were made over a range of set temperatures and strains. From this set of measurements, the average value of the slopes and the values of $F(R_1, R_2)$ and $\lambda_{b2}$ at 0 strain and 0° C. were calculated. This allowed applicants to write a system of two equations for $F(R_1, R_2)$ and $\lambda_{b2}$ vs. strain $\epsilon$ and temperature T which is given by:

$$\frac{F(R_1, R_2) + 0.36}{\lambda_{b2} - 1320.53} = \begin{vmatrix} -5 \times 10^{-5} & 7 \times 10^{-3} \\ 1.03 \times 10^{-3} & 8.7 \times 10^{-3} \end{vmatrix} \begin{matrix} \epsilon \\ T \end{matrix} \qquad (2)$$

Here $F(R_1,R_2)$ is dimensionless, $\lambda_{b2}$ is in nm, $\epsilon$ is in $\mu$strain and T is in °C. To determine strain and temperature from $F(R_1,R_2)$ and $\lambda_{b2}$, Eq 2 is inverted.

Test of Sensor Response

Figure 4:
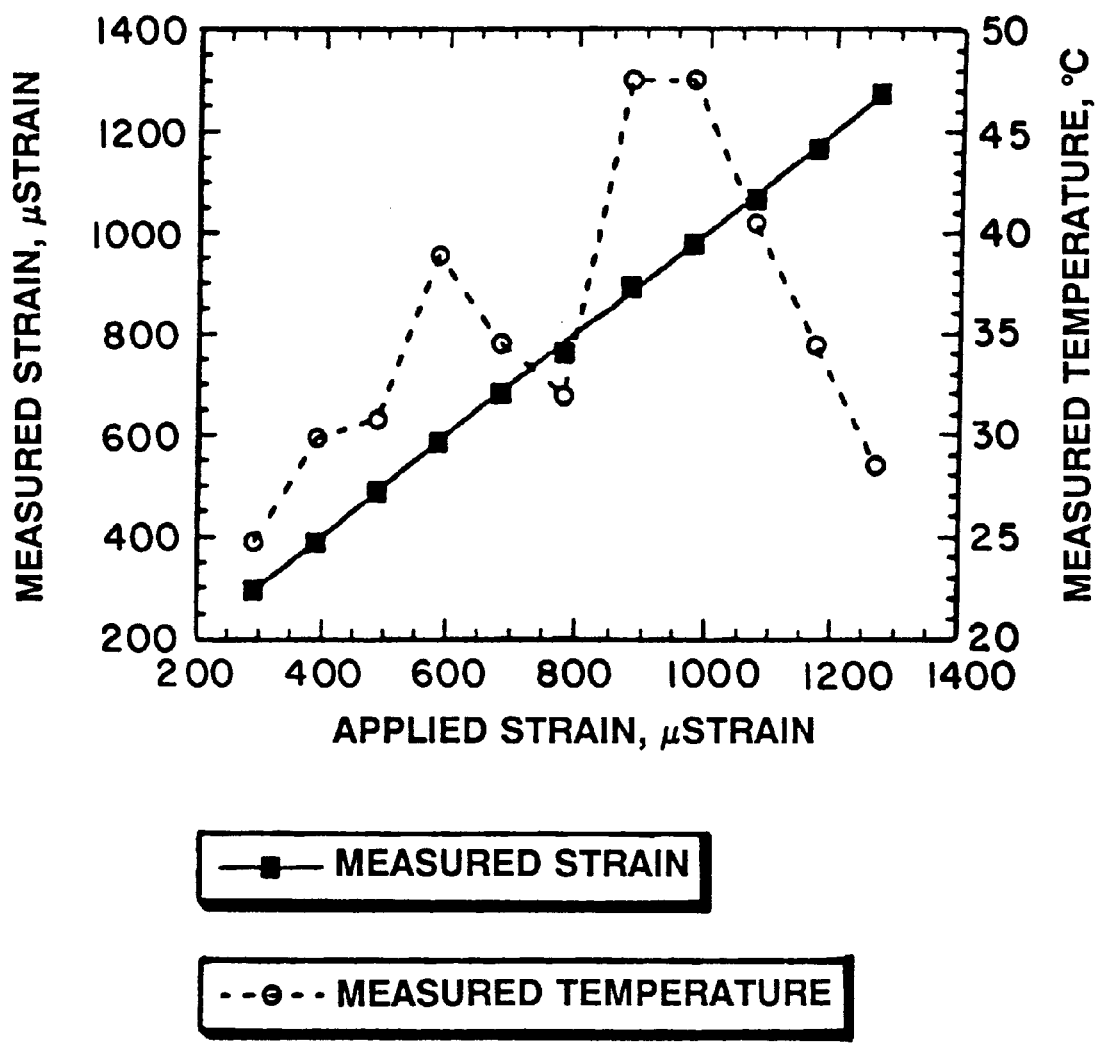
FIG. 4 illustrates the measured strain, derived from Eq. 2, vs applied strain, while temperature was varied from 25–50° C., as shown on the right-hand axis; that the standard deviation of the measured strain from the straight line fit is +/−9 $\mu$strain; and that the straight line fit is given by measured strain=−2.18 $\mu$strain+0.997 (applied strain).

FIG. 4 shows the result of a test of the sensor 13. The strain applied to the system was increased from 290 $\mu$strain to 1270 $\mu$strain while the temperature was varied between 25–50° C. The strain and the temperature were calculated from the measured values of $F(R_1,R_2)$ and $\lambda_{b2}$ using Eq. 2. To show the quality of the strain measurement over this wide temperature range, measured strain has been plotted vs. applied strain. The measured temperature is shown on the right-hand vertical axis. The standard deviation of the measured strain from the straight line fit is +/−9 $\mu$strain. This computation does not include the effect of the error in the applied strain. Similarly, the applicants also compared the measured temperature to the applied temperature and found that the standard deviation of the measured temperature was +/−2° C.

A static test was also performed. In this test, the grating was set at a static strain of 978 $\mu$strain, and the strain was measured while the temperature was varied. Over a 30 minute measurement and 25–50° C., the strain was measured to be 978 $\mu$strain with a standard deviation of +/−3 $\mu$strain.

It should be noted at this time that, after the OSA 23 has measured the intensities $R_1$ and $R_2$ and the wavelengths $\lambda_{b1}$ and $\lambda_{b2}$ of the light reflected by the FBGs 17 and 19, the computer 24 uses those values to mathematically compute the function $F(R_1,R_2)$, the matrix of equation Eq. 2, the matrix inversion, other mathematical operations and the subsequent calculations of strain and temperature by well know and obvious mathematical operations, well known to those skilled in the art.

A hybrid grating sensor for the simultaneous determination of strain and temperature based on the use of a combination of LPG and FBG elements has been described. The large difference in temperature response of the LPG compared to the FBG make LPGs excellent candidates for dual grating sensors, and further improvements in accuracy of the applied strain and temperature should allow better calibration and more accurate strain and temperature separation. The sensor configuration presented here uses the advantages of the LPG sensor while allowing the interrogation to be performed entirely on the FBG reflections.

Alternatives

The FBG and LPG devices could be overlapped (collocated) resulting in a more compact, single element sensor instead of the three-element device discussed herein.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A grating sensor system for simultaneously determining strain and temperature, said system comprising:

light source means for providing a continuous broadband light;

a single mode fiber coupled to said light source means;

a hybrid fiber grating sensor written into said single mode fiber, said sensor comprised of a long period grating having a first center wavelength and first and second fiber Bragg gratings respectively having second and third center wavelengths for respectively reflecting light therefrom at about the second and third center wavelengths, with said first center wavelength being between said second and third center wavelengths, said long period grating producing a broadband power loss around its first center wavelength, said first, second and third center wavelengths shifting with strain and temperature, said sensor measuring the effect of the long period grating wavelength shift on the relative intensities of the light reflected from the first and second fiber Bragg gratings to generate reflected light signals;

analyzer means responsive to the reflected light signals from said hybrid fiber grating sensor for measuring the wavelengths and intensities in the reflected light signals; and means responsive to the measured wavelengths and intensities of light from said analyzer means for simultaneously calculating the strain and temperature being sensed by said sensor.

2. The grating sensor system of claim 1 wherein:

said long period grating and said first and second fiber Bragg gratings are written in sequence at different locations along said single mode fiber.

3. The grating sensor system of claim 1 wherein:

said long period grating and said first and second fiber Bragg gratings are sequentially written into said single mode fiber at the same location along said single mode fiber.

4. The grating sensor system of claim 1 wherein:

said long period grating is written into a first location in said single mode fiber, and said first and second fiber Bragg gratings are written into a second location in said single mode fiber.

5. The grating sensor system of claim 1 wherein:

said first and second fiber Bragg gratings are written into said single mode fiber and fused to one end of the single mode fiber.

6. The grating sensor system of claim 1 wherein:

said light source means is an edge light emitting diode.

7. The grating sensor system of claim 1 wherein:

said long period grating is about 2.5 centimeters long with a center wavelength of about 1306 nm; and said first and second fiber Bragg gratings are each about 5 mm long, with said first and second fiber Bragg gratings having respective center wavelengths at about 1293 nm and about 1321 nm.

8. The grating sensor system of claim 1 wherein:

said long period grating is written with a grating period of 246 $\mu$m.

9. The grating sensor system of claim 1 wherein:

said analyzing means is an optical spectrum analyzer.

10. The grating sensor system of claim 1 wherein:

said calculating means is a computer.

11. The grating sensor system of claim 1 wherein:

said calculating means is a microprocessor.

12. A grating sensor system for simultaneously determining strain and temperature applied thereto, said system comprising:

light source means for providing continuous broadband light;

a fiber coupled to said light source means;

a hybrid grating sensor written into said fiber, said hybrid grating sensor comprised of a long period grating for attenuating light at all wavelengths and having a first center wavelength which shifts with strain and temperature, and further having first and second 50% transmission points, said hybrid grating sensor further including first and second fiber Bragg gratings respectively having second and third center wavelengths lying near the first and second 50% transmission points of said long period grating, said hybrid grating sensor measuring the effect of the long period grating wavelength shift on the relative intensities of the reflections from said first and second Bragg gratings and producing reflected light signals;

analyzer means responsive to the reflected light signals from said hybrid grating sensor for measuring the wavelengths and intensities in the reflected light signals; and means responsive to the measured wavelengths and intensities of light from said analyzer means for simultaneously calculating the strain and temperature being sensed by said sensor.

* * * * *